(12) United States Patent
Ikeda et al.

(10) Patent No.: US 9,099,821 B2
(45) Date of Patent: Aug. 4, 2015

(54) BUSBAR PLATE

(71) Applicant: Yazaki Corporation, Minato-ku, Tokyo (JP)

(72) Inventors: Tomohiro Ikeda, Kakegawa (JP); Ryuta Takishita, Kakegawa (JP); Yukihisa Kikuchi, Kakegawa (JP); Masaru Imai, Kakegawa (JP); Keizo Aoki, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 2 days.

(21) Appl. No.: 14/094,989

(22) Filed: Dec. 3, 2013

(65) Prior Publication Data

US 2014/0087591 A1    Mar. 27, 2014

Related U.S. Application Data

(63) Continuation of application No. PCT/JP2012/066532, filed on Jun. 28, 2012.

(30) Foreign Application Priority Data

Jun. 28, 2011  (JP) ................................. 2011-143295

(51) Int. Cl.
  *H01R 13/73*  (2006.01)
  *H01M 2/20*  (2006.01)
  (Continued)

(52) U.S. Cl.
  CPC ............... *H01R 13/73* (2013.01); *H01M 2/206* (2013.01); *H01M 10/0525* (2013.01); *H01R 9/2458* (2013.01); *Y02T 10/7011* (2013.01)

(58) Field of Classification Search
  CPC ......... Y02E 60/12; H01M 2/206; H01M 2/20
  See application file for complete search history.

(56) References Cited

U.S. PATENT DOCUMENTS

| 6,261,719 B1 | 7/2001 | Ikeda et al. |
| 7,029,787 B2 * | 4/2006 | Bando et al. ................. 429/156 |

(Continued)

FOREIGN PATENT DOCUMENTS

| JP | 2000149909 A | 5/2000 |
| JP | 2004362997 A | 12/2004 |

(Continued)

OTHER PUBLICATIONS

Written Opinion dated Sep. 4, 2012 issued in International Application No. PCT/JP2012/066532 (PCT/ISA/237).

(Continued)

*Primary Examiner* — Gary Paumen
(74) *Attorney, Agent, or Firm* — Sughrue Mion, PLLC

(57) ABSTRACT

A busbar plate includes a busbar plate main body and total plus/minus terminal blocks. The busbar plate main body includes a terminal accommodating chamber part having a plurality of terminal accommodating chambers. The total plus/minus terminal blocks are externally attached to terminal accommodating chambers at two ends of the busbar plate respectively, and are formed of terminal block main bodies and busbars. One ends of the busbars are fastened to total plus/minus terminals in the terminal accommodating chambers at the two ends, the other ends of the busbars are fastened to an adjacent module or a connecting busbar of an external equipment. Flexible resin material is used for the busbar plate main body, and high strength resin material is used for the terminal block main bodies.

3 Claims, 6 Drawing Sheets

(51) Int. Cl.
    *H01M 10/0525*  (2010.01)
    *H01R 9/24*  (2006.01)

(56) References Cited

U.S. PATENT DOCUMENTS

| | | | | |
|---|---|---|---|---|
| 7,229,320 | B2* | 6/2007 | Saito et al. | 439/627 |
| 8,449,333 | B2* | 5/2013 | Ikeda et al. | 439/627 |
| 2004/0043663 | A1* | 3/2004 | Ikeda et al. | 439/627 |
| 2013/0178091 | A1* | 7/2013 | Ogasawara et al. | 439/366 |
| 2013/0280959 | A1* | 10/2013 | Takase et al. | 439/627 |

FOREIGN PATENT DOCUMENTS

| JP | 2006269104 A | 10/2006 |
|---|---|---|
| JP | 2009277420 A | 11/2009 |
| JP | 2012059663 A | 3/2012 |

OTHER PUBLICATIONS

International Search Report, dated Sep. 4, 2012, issued by the International Searching Authority, in counterpart Application No. PCT/JP2012/066532.

Written Opinion, dated Sep. 4, 2012, issued by the International Searching Authority, in counterpart Application No. PCT/JP2012/066532.

* cited by examiner

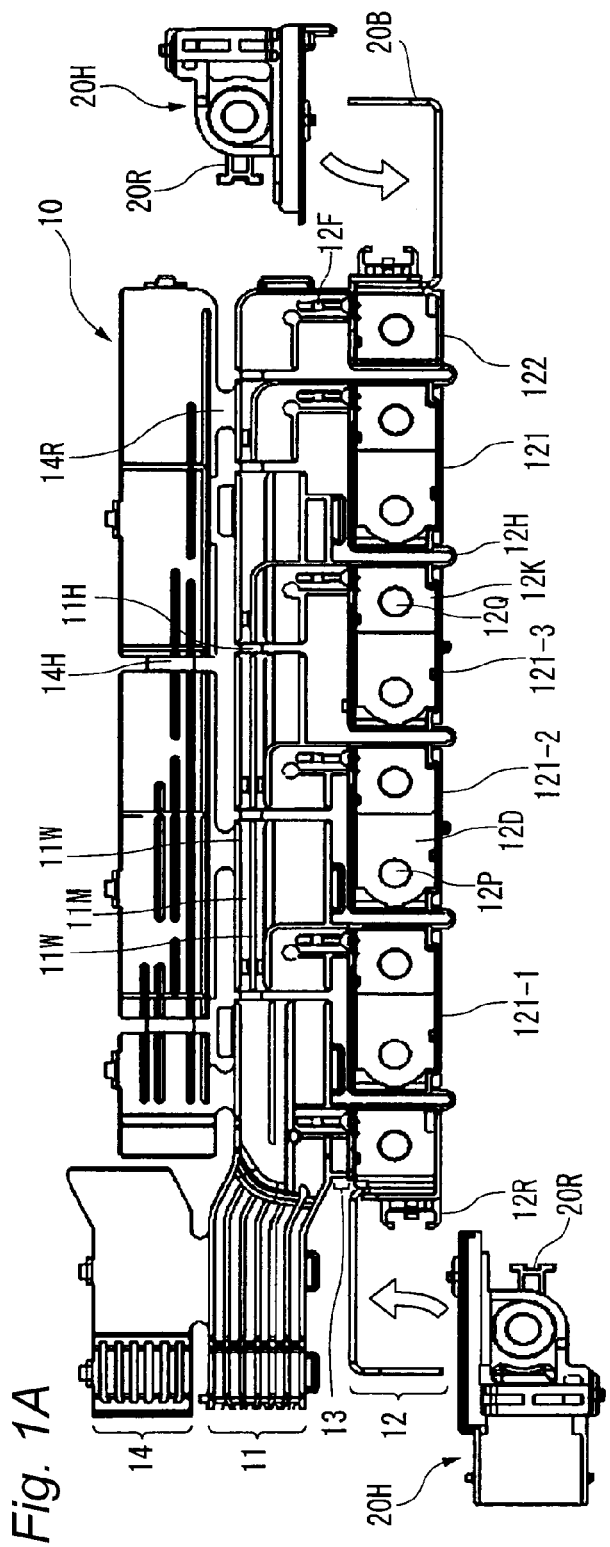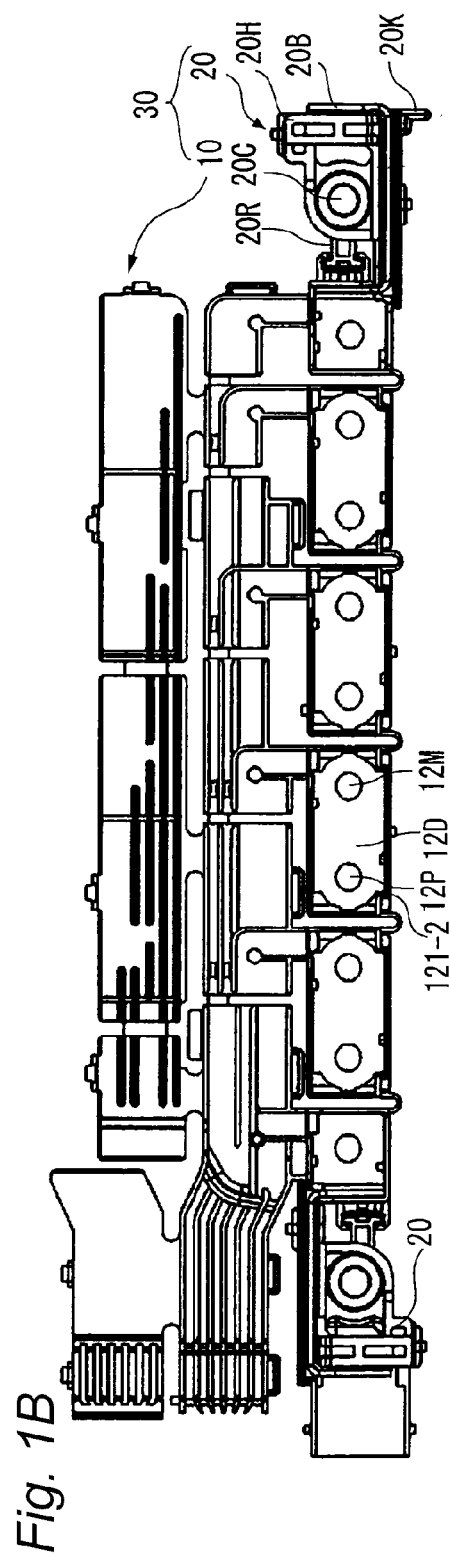

BUSBAR PLATE

CROSS REFERENCE TO RELATED APPLICATIONS

This application is a continuation of PCT application No. PCT/JP2012/066532, which was filed on Jun. 28, 2012 based on Japanese Patent Application (No. 2011-143295) filed on Jun. 28, 2011, the contents of which are incorporated herein by reference.

BACKGROUND OF THE INVENTION

1. Field of the Invention

The present invention relates to a busbar plate applied to batteries loaded into an electric car.

2. Description of the Related Art

<Busbar Plate Described in a Patent Document 1>

A busbar plate, which is used for an electric car in which batteries are loaded, is provided with a tolerance absorbing part which is formed of elastic resin material into an U-like shape to have a hinge function, to absorb tolerances of many battery cells and connect busbars (refer to the patent document 1).

FIG. 5 is a perspective view of the area near the tolerance absorbing part of the busbar plate described in the patent document 1 which has a tolerance absorbing part and a busbar. In the busbar plate described in the patent document 1, the tolerance absorbing part 120 is formed of elastic (flexible) resin material into a U-like shape to have a hinge function. A battery electrode 107 of a battery 106 is fixed to a busbar plate 100, and a connecting part 111 is fasten to a busbar 110 which is fixed to a wall part 114 of the busbar plate 100. An electric wire not shown in the figure is inserted through an electric wire insertion groove 115 under the wall part 114, and is taken out toward a leftward direction in FIG. 5.

CITATION LIST

Patent Documents

Patent document 1: JP-A-2006-269104

SUMMARY OF INVENTION

<Problems of the Invention Described in the Patent Document 1>

In one total plus part and the other total minus part at the two ends of many batteries connected in series, pole pillars are fastened to the busbars. If the busbar plate (busbar accommodating case) such as the busbar plate 100 described in the patent document 1 is formed of flexible resin materials, when the connecting part 111 which is a pole pillar is fastened to the busbar 110 to be connected to an external equipment, the wall part 114 which is a busbar mounting part of the busbar plate 100 may be deformed because the wall part 114 is flexible.

The present invention is made to solve the above problem, and the object of the present invention is to provide a busbar plate whose busbar mounting part will not be deformed when a pole pillar is fastened to a busbar to be connected to an external equipment, even if the busbar plate is made of a flexible resin material to have a hinge function.

The above object of the present invention is achieved by the following constructions (1) to (3).

(1) A busbar plate comprising:

a busbar plate main body, including a terminal accommodating chamber part having a plurality of terminal accommodating chambers, accommodating a conductive metal plate which connects a plus terminal of a battery and a minus terminal of an adjacent battery in each of the terminal accommodating chambers, and connecting the terminal accommodating chambers which are separately provided along a longitudinal direction of the terminal accommodating chamber part and are adjacent to each other by U-shaped elastic connecting members; and total plus/minus terminal blocks, which are externally attached to the terminal accommodating chambers at two ends respectively, and which are formed of terminal block main bodies and busbars, wherein one ends of the busbars are fastened to total plus/minus terminals in the terminal accommodating chambers at the two ends, the other ends of the busbars are fastened to an adjacent module or a connecting busbar of an external equipment, and flexible resin material is used for the busbar plate main body, and high strength resin material is used for the terminal block main bodies.

(2) The busbar plate, wherein the terminal block main body is formed with a press-fitting groove into which the busbar is inserted.

(3) The busbar plate, wherein a temporary holding projection, which is used to temporarily hold a mating component when the busbar plate is attached to the mating component, is formed at the upper part of the surface of the terminal block main body that faces the mating component.

According to the construction described in the above (1), the total plus/minus terminal blocks are separated from the busbar plate main body. Because the busbar plate main body is formed of soft resin material to have a hinge function, the tolerance of the battery cells can be absorbed by the busbar plate main body. Because the total plus/minus terminal blocks are formed of high strength resin material, when the pole pillar is fastened to the busbar, the mounting part of the busbar will not be deformed, and holding can be ensured.

According to the construction described in the above (2), all have to be done is that one side of the busbar which is inserted into the press-fitting groove is fastened to the pole pillar, and the other side is fastened to the total plus/minus extracting part. Therefore, because thick electric wires are not used for extracting the total plus and minus, a series of operations that are necessary for connecting electric wires become needless so that cost can be decreased.

According to the construction described in the above (3), the temporary holding projection passes through a locking frame of a mating side terminal block, so that the mating side terminal block is caught onto the total plus/minus terminal block and can be temporarily held. Therefore, hands can be released when the total plus and minus terminal block 20 is fastened, and the assembling efficiency is improved.

BRIEF DESCRIPTION OF THE DRAWINGS

FIGS. 1A and 1B are top views which shows the busbar plate according to an embodiment of the present invention, in which FIG. 1A shows that total plus/minus terminal blocks which are separated from a busbar plate main body are removed from the busbar plate main body, and FIG. 1B shows that the total plus/minus terminal blocks are fitted to the busbar plate main body.

FIGS. 2A to 2C are perspective views which describes that a busbar is press-fitted into the terminal block main body shown in FIGS. 1A and 1B, in which FIG. 2A shows the busbar to be press-fitted, FIG. 2B shows the terminal block main body to be press-fitted, and FIG. 2C shows a total plus/minus terminal block which is the terminal block main body to which the busbar has been press-fitted, respectively.

FIGS. 4A and 4B are perspective views which show that the busbar plates which include the total plus/minus terminal blocks according to the present embodiment are assembled to a mating component, in which FIG. 4A is an overall figure, and FIG. 4B is an enlarged figure of a B part of FIG. 4A which is surrounded by a circle.

DETAILED DESCRIPTION OF THE EXEMPLARY EMBODIMENTS

Figure 2A:
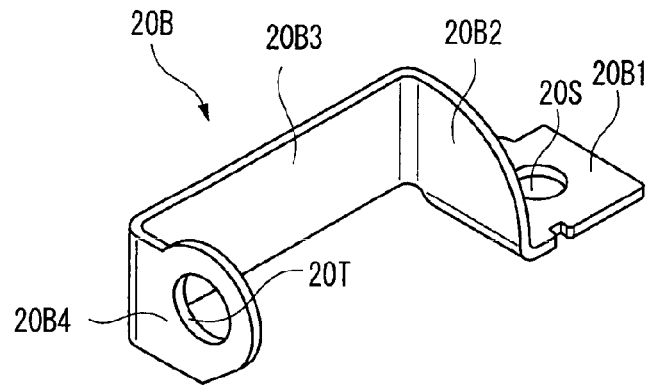

Next, a busbar plate is described with reference to the figures whose busbar mounting part will not be deformed when a pole pillar is fastened to a busbar to be connected to an external equipment, even if the busbar plate is made of a flexible resin material to have a hinge function.

<The Construction of a Busbar Plate 30>

FIGS. 1A and 1B are top views which show the busbar plate 30 according to an embodiment of the present invention. FIG. 1A shows that total plus/minus terminal blocks 20 according to the embodiment which are separated from a busbar plate main body 10 are removed from the busbar plate main body 10. FIG. 1B shows that the total plus/minus terminal blocks 20 are fitted to the busbar plate main body 10.

In FIG. 1B which is a top view of the busbar plate 30, the busbar plate 30 is fixed at ten pole pillar fastening parts and two fastening parts towards the end plates which sandwich battery cells from two sides. The busbar plate main body 10 has the ten pole pillar fastening parts, and the total plus/minus terminal blocks 20 according to the present embodiment which are fitted to the two ends of the bus plate main body 10 have the two fastening parts towards the end plates which sandwich the battery cells from two sides. In other words, if the separated total plus/minus terminal blocks 20 are fitted to the two sides of the separated busbar plate main body 10 in FIG. 1A, the busbar plate 30 is completed. Thus, the busbar plate main body 10 is described firstly.

<The Busbar Plate Main Body in the Embodiment>

The busbar plate main body 10 is entirely made by plastic molding, and includes a voltage detecting wire accommodating part 11, a terminal accommodating chamber part 12 in which battery terminals are accommodated, a voltage detecting wire guiding part 13 by which the voltage detecting wire accommodating part 11 and the terminal accommodating chamber part 12 are coupled, and a cover 14. Next, the voltage detecting wire accommodating part 11, the terminal accommodating chamber part 12, the voltage detecting wire guiding part 13, and the cover 14 will be briefly described.

<The Function of the Voltage Detecting Wire Accommodating Part 11>

For lithium-ion batteries, voltage detecting wires are drawn out from each lithium-ion battery cell and linked to a connector, and are connected to a common voltage detecting resistance element, which is loaded on a print circuit board, through the connector in a time-division manner. Whether there is an abnormal cell is monitored by comparing electric currents in a CPU and comparing the voltages of the lithium-ion batteries.

For this purpose, a plurality of voltage detecting wires, whose number corresponds to the number of the cells, are necessary. Therefore, to prevent the electric wires from contacting each other and short-circuiting, in a traditional equipment, each electric wire was covered by a protective member such as a corrugated pipe or a tube. Furthermore, it is necessary to bundle and fix all the electric wires with tapes or bands. However, it is assumed in the present embodiment that a voltage detecting wire accommodating part of the following construction is provided without performing any of the above things. Therefore, the operation of covering each electric wire with a protective member such as a corrugated pipe or a tube becomes unnecessary, and it is not necessary to bundle and fix all the electric wires with tapes or bands.

<The Construction of the Voltage Detecting Wire Accommodating Part 11>

The voltage detecting wire accommodating part 11 is used to wire the voltage detecting wires W in parallel, which are drawn out from the batteries, to prevent the voltage detecting wires W from contacting each other until the connector connected to the terminal block. By forming a plurality of walls 11W, which are parallel to each other, along the sequence of the batteries between the batteries and the connector, electric wire arranging grooves 11M are formed between the walls 11W. The electric wire arranging grooves 11M between the walls 11W can be deep because the walls 11W are high. Therefore, by accommodating a plurality of voltage detecting electric wires W from top to bottom in one electric wire arranging groove 11 M, the number of the electric wire arranging grooves 11M is decreased so that the width size in the direction of crossing the electric wire arranging grooves of the voltage detecting wire accommodating part 11 can be downsized.

Such electric wire arranging grooves 11M are not continuous grooves which straightly connect the batteries to the connector respectively. The grooves are divided for each battery, and the fronts and the backs of the divided grooves are connected by connecting members (U-shaped elastic connecting members) 11H which are formed of the same resin into a U-like shape, respectively, so that the voltage detecting wire accommodating part 11 has a hinge function because of the elasticity of the resin material itself. In this way, the electric wire arranging grooves 11M are divided into sections for each battery, and battery pitch tolerance absorbing parts are formed by connecting the front and back side walls of the divided grooves with the U-shaped elastic connecting members 11H, respectively. Therefore, even if there is a battery pitch tolerance for each battery, the tolerance can be absorbed. Therefore, stress is not applied on any part of the voltage detecting wire accommodating part 11, and the voltage detecting wire accommodating parts 11 which are strong and suitable for long-term use are obtained.

<The Terminal Accommodating Chamber Part 12>

The terminal accommodating chamber part 12 is formed by connecting a plurality of terminal accommodating chambers 121 (four in FIGS. 1A and 1B), which has a rectangular box-like shape and has no top wall, and by connecting two terminal accommodating chambers 122, which has a square box-like shape and has no top wall, at two ends of the terminal accommodating chambers 121.

A plus terminal hole through which the plus terminal of a battery penetrates and a minus terminal hole through which the minus terminal of an adjacent battery penetrates are formed at the bottom of each terminal accommodating chamber 121, respectively. A plus terminal hole through which the plus terminal of a battery penetrates or a minus terminal hole through which the minus terminal of a battery penetrates is formed at the bottom of the terminal accommodating chamber 122 at either of the two ends.

A terminal accommodating chamber 121 and an adjacent terminal accommodating chamber 121, and a terminal accommodating chamber 121 and an adjacent terminal accommodating chamber 122 are spaced from each other at predetermined intervals, and are connected by connecting members 12H (U-shaped elastic connecting member), which are formed of the same resin into a U shape, to have a hinge function because the resin material itself has flexibility.

Because the interval between a terminal accommodating chamber 121 and an adjacent terminal accommodating chamber 121, 122 can be adjusted by the hinge function (shrinkage/expansion) of the U-shaped elastic connecting member 12H, the tolerance in battery pitch, if any, can be absorbed by the U-shaped elastic connecting member 12H.

A busbar 12D described below is accommodated at the bottom of the terminal accommodating chamber 121, and a voltage detecting terminal 12K which is half the size of the busbar 12D is accommodated on the busbar 12D.

<The Busbar 12D>

The busbar 12D of the terminal accommodating chamber 121 is a conductive metal plate which has a nearly-rectangular shape and is entirely accommodated at the bottom of the terminal accommodating chamber 121, and is provided with a through hole 12P through which the plus terminal of a battery which has penetrated through the plus terminal hole at the bottom of the terminal accommodating chamber 121 further penetrates, and a through hole 12M through which the minus terminal of an adjacent battery which has penetrated through the minus terminal hole at the bottom of the terminal accommodating chamber 121 further penetrates, respectively. Thus, when the busbar 12D is accommodated at the entire bottom of the terminal accommodating chamber 121, the plus terminal of a battery is made to penetrate through the through hole 12P of the busbar 12D, and the minus terminal of an adjacent battery is made to penetrate the through hole 12M of the busbar 12D, so that a series-connected circuit of the battery and the adjacent battery is formed by the busbar 12D by nut-fastening the terminals respectively.

<The Voltage Detecting Terminal 12K>

The voltage detecting terminals 12K are nearly-square shaped conductive metal plates, which are half the size of the bottom of the terminal accommodating chamber 121 and are accommodated at the bottom of the terminal accommodating chamber 122, and are superposed on the busbars 12D which are accommodated at the bottoms of the terminal accommodating chambers 121 and 122. The voltage detecting terminal 12KA is provided with a through hole 12Q through which a battery terminal penetrates. A fastening foot 12F is formed to extend from one corner of the voltage detecting terminal 12K, and an end of a voltage detecting electric wire is fastened to the fastening foot 12F.

<The Voltage Detecting Wire Guiding Part 13>

In order to draw out the voltage detecting wires from each lithium-ion battery cell, the voltage detecting wire guiding part 13 is formed between the voltage detecting wire accommodating part 11 and the terminal accommodating chambers 121 or 122 respectively, and the voltage detecting wires are wired in the voltage detecting wire guiding part 13. The voltage detecting wires are wired from the terminal accommodating chambers 121 or 122 to the electric wire arranging grooves 11M through the voltage detecting wire guiding part 13 in this way.

<The Cover 14>

The cover 14 is used to cover the voltage detecting wire accommodating part 11, and is connected with the voltage detecting wire accommodating part 11 through elastic joining parts 14R which are formed at a plurality of (three in FIGS. 1A and 1B) places and have hinge functions. The cover 14 is line symmetric to the voltage detecting wire accommodating part 11 in principle with the elastic joining part 14R as the center. The cover 14 is divided into sections in the longitudinal direction, and the fronts and backs of the divided cover sections 14 are connected by connecting members (U-shaped elastic connecting member) 14H which is formed of the same resin into a U-like shape so that the cover 14 has a hinge function because the resin material itself has flexibility. Therefore, the cover 14 is also formed with battery pitch tolerance absorbing parts.

<Attaching the Busbar Plate 30 to a Battery Assembly>

When the busbar plate 30, in which the busbar plate main body 10 fits with the total plus/minus terminal blocks 20, is to be attached to a battery assembly which includes many batteries, first, cuboid-like batteries having plus terminals and minus terminals are arranged side by side so that the plus terminal of a battery comes close to the minus terminal of an adjacent battery, and the minus terminal of the battery comes close to the plus terminal of an adjacent battery. Then, the plus terminal of a battery is made to penetrate through a through hole 12P of a busbar 12D which is accommodated at the bottom of the terminal accommodating chamber 121 of the terminal accommodating chamber part 12, and the minus terminal of an adjacent battery is made to penetrate through a through hole 12M of the busbar 12D and a through hole 12Q of a voltage detecting terminal 12K overlaid on the through hole 12M of the busbar 12D, and nuts are fitted to fasten the terminals. Thereby, when the plus terminal of the battery and the minus terminal of the adjacent battery are electrically connected by the busbar 12D, the minus terminal of the adjacent battery and the voltage detecting electric wire W are electrically connected by the voltage detecting terminal 12K.

The same operation is performed on all battery terminals at the battery plus terminal side.

Further, the same operation is performed on all battery terminals at the battery minus terminal side.

Thereby, finally, all batteries are connected in series by the busbars 12D.

The terminals at the two ends of the batteries connected in series become total plus terminals and total minus terminals. In the total plus/minus part, the busbar 12D, the voltage detecting terminal 12K, and a pole pillar fastening part (one end) 20B1 of a total plus/minus busbar (busbar) 20B formed into a special shape according to the present embodiment are gathered to be nut-fastened. A total plus/minus extracting part (other end) 20B4 of the total plus/minus busbar 20B is overlaid on a connecting busbar of an adjacent module or an external equipment to be bolt-fastened.

Figure 2B:
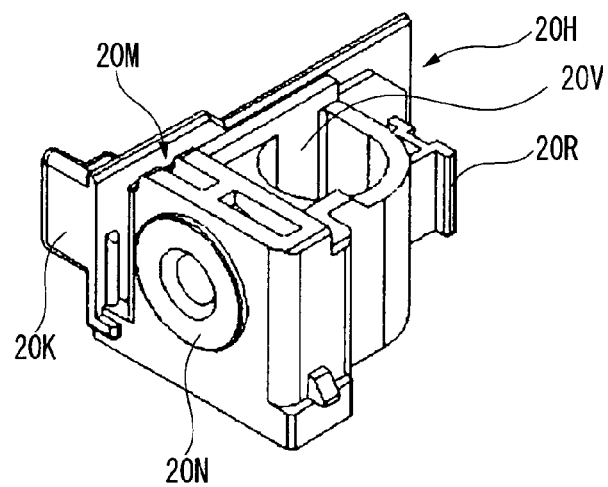
Figure 2C:
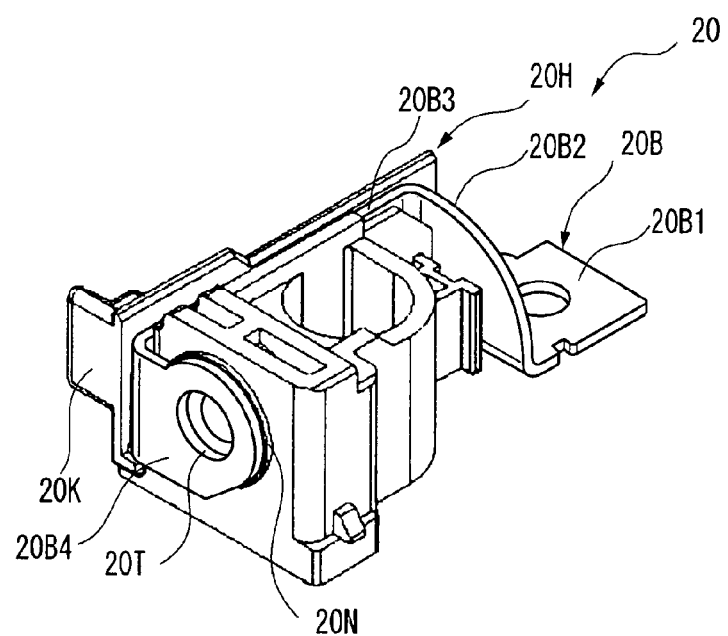

The total plus/minus terminal blocks 20 according to the present embodiment are fitted to the total plus/minus parts at the two ends of the above busbar plate main body 10. The total plus/minus terminal blocks 20 according to the present embodiment, as shown in FIGS. 2A to 2C, include a terminal block main body 20H and a total plus/minus busbar 20B. FIGS. 2A to 2C are perspective views which show that the total plus/minus busbar 20B according to the present embodiment is press-fitted to the terminal block main body 20H according to the same embodiment. FIG. 2A shows the total plus/minus busbar 20B to be press-fitted, FIG. 2B shows the terminal block main body 20H to be press-fitted, and FIG. 2C shows the terminal block main body 20H to which the total plus/minus busbar 20B has been press-fitted, in other words, the total plus/minus terminal block 20, respectively.

Next, the total plus/minus busbar 20B and the terminal block main body 20H will be described based on FIGS. 2A to 2C.

<The Total Plus/Minus Busbar 20B>

The total plus/minus busbar 20B, as shown in FIG. 2A is formed by forging a long conductive metal plate whose expanded form has an L-like shape, and includes, from the end of the short side of the L-like shape, a pole pillar fastening part 20B1 which includes an insertion hole 20S into which a pole pillar will be inserted and nut-fastened, an upright bended part 20B2 which stands up perpendicularly to the pole pillar fastening part 20B1 at the right angle part of the L-like shape, a straight part 20B3 which is further bent perpendicularly to the upright bended part 20B2 and extended straightly, and which is press-fitted into a press-fitting groove 20M of the terminal block main body 20H (refer to FIG. 2B), and a total plus/minus extracting part 20B4 which is the end of the long side of the L-like shape that is further bent perpendicularly and which includes an extracting hole 20T which is overlaid on a nut 20N (refer to FIG. 2B) which is insert-molded on a total plus/minus extracting surface of the terminal block main body 20H.

<The Terminal Block Main Body 20H>

The terminal block main body 20H according to the present embodiment (refer to FIG. 2B) is formed to have five features described below.

(1) A collar 20C is insert-molded at a facing surface which faces an end plate.

In FIG. 2B, a large bolt through hole 20V is formed at the center of the terminal block main body 20H to penetrate the terminal block main body 20H in a vertical direction in the figure, and the collar 20C (refer to FIG. 3) is formed at a facing surface of the terminal block main body 20H which faces an end plate at the bottom when the terminal block main body 20H is fixed to the end plate.

(2) The nut 20N is insert-molded on a total plus/minus extracting surface.

In FIG. 2B, the terminal block 20H is formed with the nut 20N on the total plus/minus extracting surface of the total plus/minus terminal block 20. The extracting hole 20T of the total plus/minus extracting part 20B4 of the above-described total plus/minus busbar 20B is overlaid on the nut 20N and bolt-fastened.

(3) The press-fitting groove 20M is formed.

In FIG. 2B, the terminal block 20H is formed with the press-fitting groove 20M which consists of a straight linear thin slit and into which the straight part 20B3 of the total plus/minus busbar 20B is to be press-fitted. When the straight part 20B3 of the total plus/minus busbar 20B is press-fitted from above the press-fitting groove 20M in such a direction that the extracting hole 20T of the total plus/minus extracting part 20B4 of the total plus/minus busbar 20B is overlaid on the nut 20N on the total plus/minus extracting surface of the terminal block main body 20H, as shown in FIG. 2C, the straight part 20B3 is press-fitted into the press-fitting groove 20M, and the extracting hole 20T of the total plus/minus extracting part 20B4 is overlaid on the nut 20N on the total plus/minus extracting surface.

The screw diameters of the insertion hole 20S of the pole pillar fastening part 20B1 (refer to FIG. 2A) and the collar 20C of the end plate fixing part (refer to FIG. 3) are small and fastening torques are also small, but the screw diameter of the nut 20N of the total plus/minus fastening part (refer to FIG. 2B) is large and the fastening torque is also large.

(4) A fitting piece 20R is formed.

The terminal block main body 20H is formed with a male fitting piece (convex part) 20R (refer to FIGS. 2B and 3) at the fitting side of the terminal block main body 20H to be fitted with a female fitting piece (concave part) 12R which is formed at the outside of either of the square terminal accommodating chambers 122 at the two ends of the busbar plate main body 10 (refer to FIG. 1A). The busbar plate 30 in FIG. 1B is finished by fitting the fitting pieces 20R of the terminal block main bodies 20H with the fitting pieces 12R at the two ends of the busbar plate main body 10 in FIG. 1A.

In the present embodiment, because the busbar plate main body 10 is molded with flexible soft resin material to have the function of a large hinge, and the total plus/minus terminal block 20 is separately formed by using high strength resin material so that the total plus/minus terminal block 20 can withstand a large fastening torque at the total plus/minus fastening part, holding can be surely realized.

(5) A temporary holding projection 20K is formed.

Figure 4A:
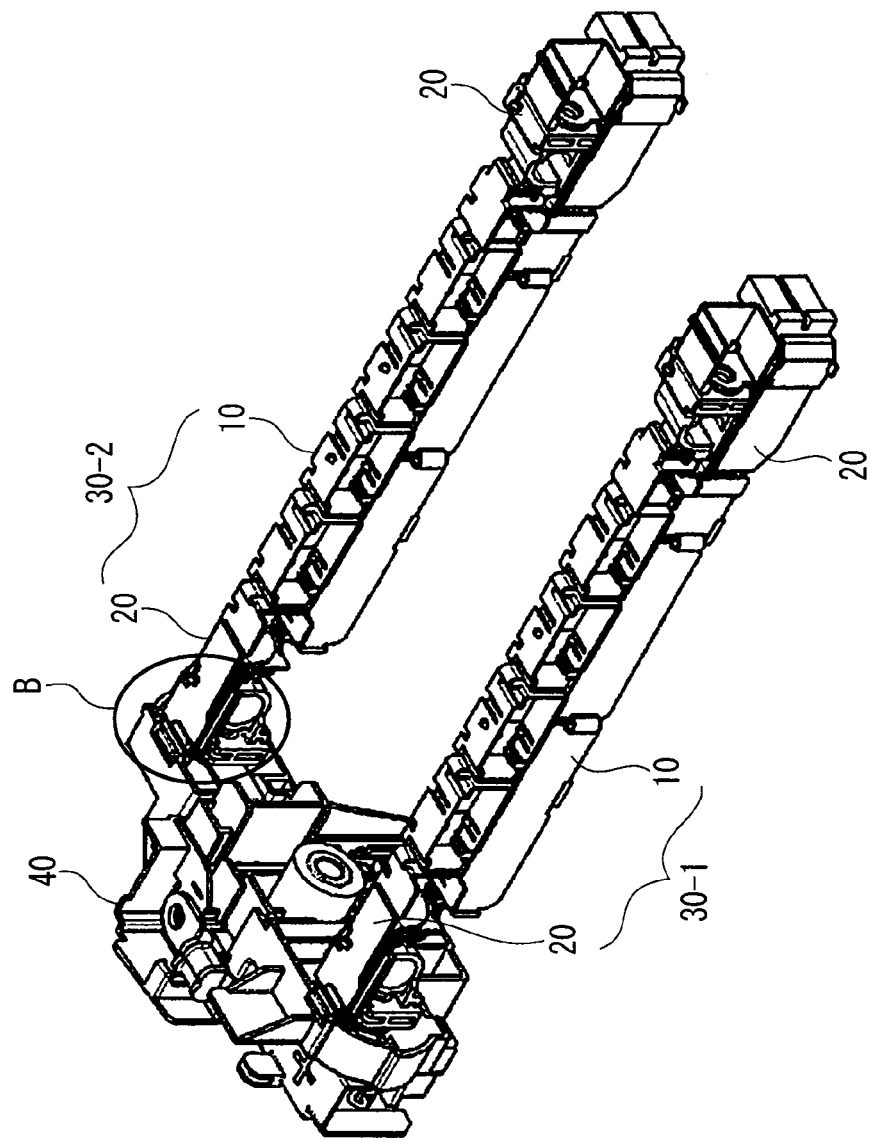
Figure 4B:
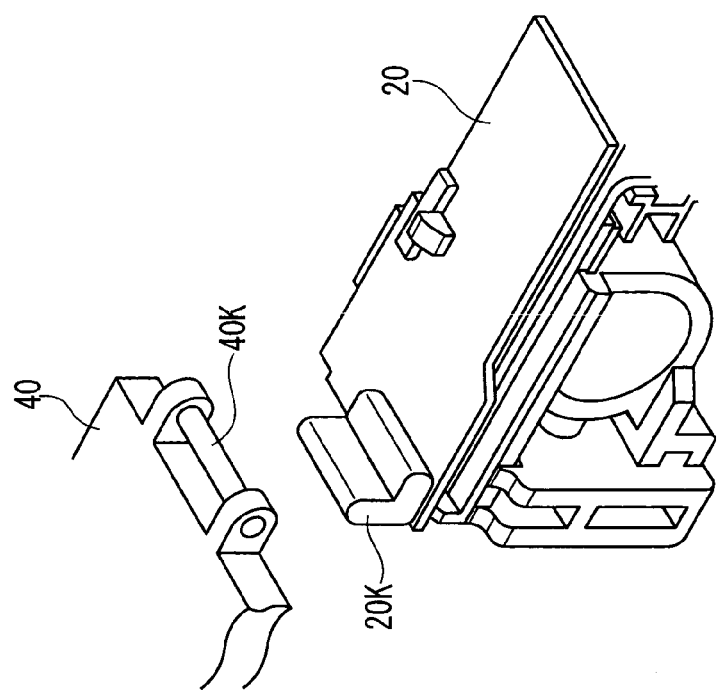
Figure 5:
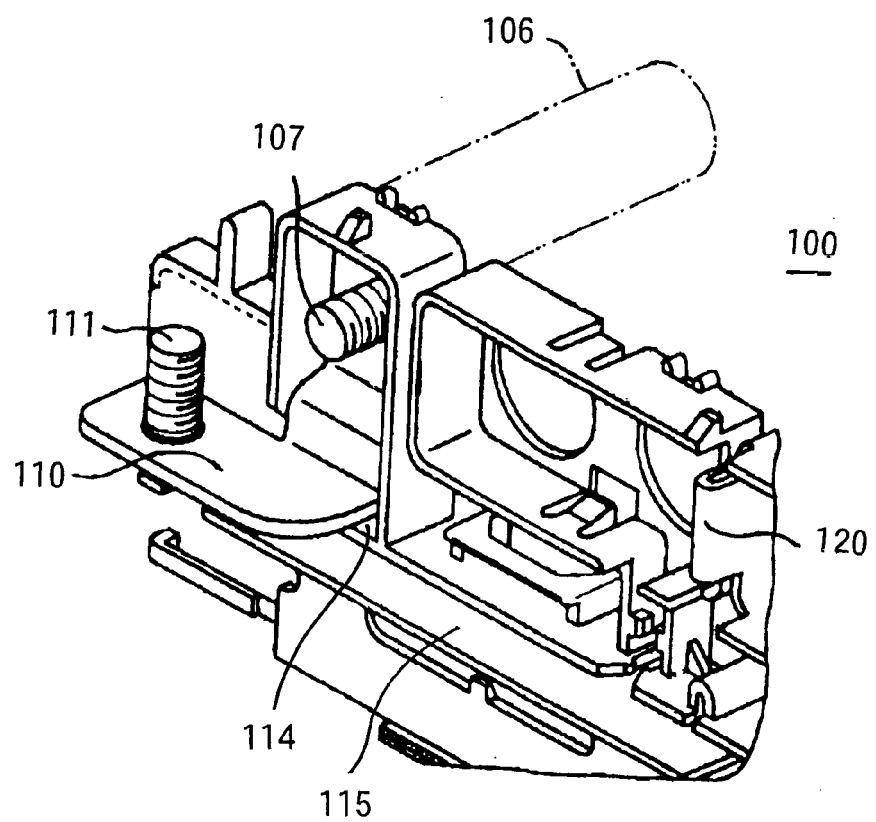
FIG. 5 is a perspective view of the area near the tolerance absorbing part of the busbar plate described in the patent document 1 which has a tolerance absorbing part and a busbar.

The temporary holding projection 20K is formed at the upper part of the surface of the terminal block main body 20H that faces a mating component to be assembled to the terminal block main body 20H to temporarily hold the mating component. FIGS. 4A and 4B are perspective views which show that the busbar plates 30 which include the total plus/minus terminal blocks 20 according to the present embodiment are assembled to a mating side terminal block (mating component) 40. In an overall view of FIG. 4A, the busbar plates 30 which include the busbar plate main bodies 10 and the total plus/minus terminal blocks 20 according to the present embodiment are connected to the mating side terminal block 40. At this time, as shown in FIG. 4B, the terminal block main body 20H of the total plus/minus terminal block 20 according to the present embodiment is formed with the temporary holding projection 20K, and the mating side terminal block 40 is formed with a locking frame 40K. Next, the function of the temporary holding projection 20K will be described.

<The Function of the Temporary Holding Projection 20K>

Two busbar plates 30-1 and 30-2 are arranged in parallel with each other in FIG. 4A, and the battery assembly (not shown in the figure) is placed between the busbar plates 30-1 and 30-2. In this case, a battery including a plus terminal and a minus terminal is so disposed, for example as shown in FIG. 4A, that the plus terminal is at the upper side and the minus terminal is at the lower side, and an adjacent battery is so disposed that the minus terminal is at the upper side and the plus terminal is at the lower side. Furthermore, a third battery adjacent to the adjacent battery is so disposed that the plus terminal is at the upper side and the minus terminal is at the lower side. Then, all ten batteries are disposed by repeating this procedure. The terminals which include the plus/minus terminals alternately arranged at the upper side of the ten juxtaposed batteries are respectively inserted into ten insertion holes of the busbar plate main body 10 of the busbar plate 30-1, and are respectively nut-fastened through busbars 12D. In addition, the terminals which include the minus/plus terminals alternately arranged at the lower side of the ten batteries are respectively inserted into ten insertion holes of the busbar plate main body 10 of another busbar plate 30-3 (not shown in the figure), and are respectively nut-fastened through busbars 12D,.

All of the ten batteries are serially connected by the busbar plate main bodies 10 of the busbar plate 30-1 at the front side in the two busbar plates 30-1 and 30-2 shown in FIG. 4A and the other busbar plate 30-3 (not shown in the figure) under the busbar plate 30-1, and one total plus/minus part connected in series is connected to a board having a voltage monitoring circuit through the total plus/minus terminal block 20. The other total plus/minus part connected in series is at the front side of FIG. 4A (the side where there is not a mating side terminal block 40), and is connected to the other mating side terminal block (not shown in the figure) through the other total plus/minus terminal block 20.

The terminal voltages of the ten similar batteries are respectively detected by the voltage detecting terminals 12K, as described in FIGS. 1A and 1B. Ten voltage detecting electric wires pass through the voltage detecting electric wire accommodating part 11 of the busbar plate main body 10-1 (refer to FIG. 1) and are connected to the mating side terminal block 40 through a connector (not shown in the figure).

The operation on the busbar plate 30-1 at the front side is also similarly performed on the busbar plate 30-2 at the back side as shown in FIG. 4A. All of other ten batteries are connected in series by busbar plate main bodies 10. One total plus/minus part connected in series is connected to the mating side terminal block 40 through the total plus/minus terminal block 20.

In this way, the total battery voltage gathered from the busbar plates 30-1 and 30-1 and each battery terminal voltage are sent to the mating side terminal block 40. Therefore, it is necessary to connect the busbar plate 30-1 to the mating side terminal block 40 electrically and mechanically. At the time of assembling, as shown in FIG. 4B, the temporary holding projection 20K, which the terminal block main body 20H of the total plus/minus terminal block 20 according to the present embodiment is formed with, passes through the locking frame 40K of the mating side terminal block 40 so that the mating side terminal block 40 is caught onto the total plus/minus terminal block 20 and can be temporarily held. Therefore, hands can be released when the total plus and minus terminal block 20 is fastened, and the assembling efficiency is improved.

<Operation Procedure>

An operation procedure example of the busbar plate 30 according to the present embodiment is as follows.

(1) The total plus/minus busbar 20B is press-fitted into the terminal block main body 20H.

(2) The terminal block main body 20H is fitted to the busbar plate 30.

(3) The busbar plate 30 is loaded to the battery assembly, and the pole pillar fastening part 20B1 is nut-fastened.

(4) A connecting busbar of an adjacent module or an external equipment is overlaid on the total plus/minus extracting part 20B4, and is bolt-fastened.

<Summary>

The present embodiment is summarized as follows.

Figure 3:
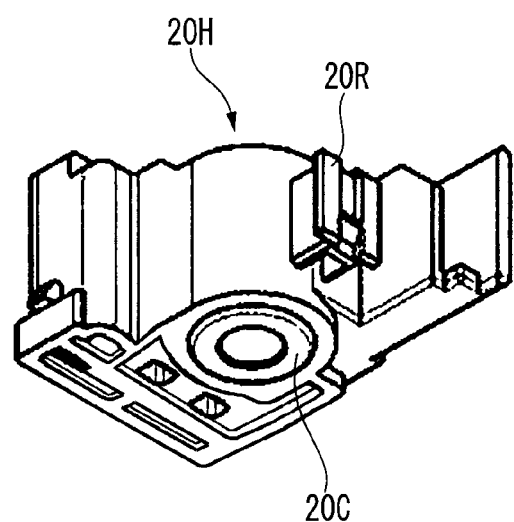
FIG. 3 is a perspective view of the total plus/minus terminal block shown in FIG. 2B which is watched from below.

(1) As shown in FIGS. 1A and 1B, in the present embodiment, the busbar plate is fixed at the ten pole pillar fastening parts and the two fastening parts towards the end plates which sandwich battery cells from two sides. (2) The separated terminal block main body is attached to the total plus/minus terminal of the busbar plate. (3) Because the busbar plate is molded with soft resin material to have the function of a large hinge, and the terminal block main body is separately formed by using high strength resin material so that the total plus/minus terminal block can withstand a large fastening torque at the total plus/minus fastening part, holding can be surely realized. (4) As shown in FIGS. 2A to 3, because the terminal block main body is insert-molded with the collar (a fixing part) which attaches the busbar plate to the end plate and the nut (the total plus/minus extracting part), a firm attachment can be ensured even if the terminal block main body is separately formed. (5) The terminal block main body is formed with the press-fitting groove into which the total plus/minus busbar shown in FIG. 2A is inserted, and all have to be done is that one side of the total plus/minus busbar which is inserted into the press-fitting groove is fastened to the pole pillar, and the other side is fastened to the total plus/minus extracting part. Therefore, because thick electric wires are not used for extracting the total plus and minus, a series of operations that are necessary for connecting electric wires become needless so that cost can be decreased. (6) The screw diameters of both the pole pillar fixing part and the end plate fixing part are small so that the fastening torque is also small, but because the screw diameter of the total plus/minus fastening part can be large, the fastening torque can also be large.

Here, the features of the busbar plate of the embodiment according to the present invention are briefly, collectively listed in the following i to iii, respectively.

[i] A busbar plate 30 includes a busbar plate main body 10 having a terminal accommodating chamber part 12 including a plurality of terminal accommodating chambers 121, 122, accommodating a conductive metal plate (busbar) 12D which connects a plus terminal of a battery and a minus terminal of an adjacent battery in each of the terminal accommodating chambers 121, 122, and connecting the terminal accommodating chambers 121, 122 which are separately provided along a longitudinal direction of the terminal accommodating chamber part 12 and are adjacent to each other by the U-shaped elastic connecting members 12H; and total plus/minus terminal blocks 120, which are externally attached to the terminal accommodating chambers 121, 122 at two ends respectively, and which are formed of the terminal block main bodies 20H and the busbars (total plus/minus busbars) 20B, wherein one ends (pole pillar fastening parts) 20B1 of the busbars (total plus/minus busbars) 20B are fastened to the total plus/minus terminals in the terminal accommodating chambers 121, 122 at the two ends, the other ends (total plus/minus extracting parts) 20B4 of the busbars (total plus/minus busbars) 20B are fastened to an adjacent module or a connecting busbar of an external equipment, and flexible resin material is used for the busbar plate main body 10, and high strength resin material is used for the terminal block main bodies 20H.

[ii] In the busbar plate 30, the terminal block main body 20H is formed with a press-fitting groove 20M into which the busbar (total plus/minus busbar) 20B is inserted.

[iii] In the busbar plate 30, a temporary holding projection 20K, which is used to temporarily hold the mating component (mating side terminal block) 40 when the busbar plate 30 is attached to the mating component (mating side terminal block) 40, is formed at the upper part of the surface of the terminal block main body 20H that faces the mating component (mating side terminal block) 40.

The embodiment of the present invention is described above, but the embodiment disclosed currently are illustrative in all aspects and the invention should not be limited to the embodiment disclosed currently. The scope of the present invention is shown in claims, and it is aimed to include all changes in the scope of the claims and in an equal meaning and scope.

According to the busbar plate based on the present invention, the tolerance of the battery cells can be absorbed to the busbar plate main body. When the pole pillar is fastened to the busbar, the mounting part of the busbar will not be deformed and holding is ensured.

What is claimed is:

1. A busbar plate comprising:
   a busbar plate main body, including a terminal accommodating chamber part having a plurality of terminal accommodating chambers, accommodating a conductive metal plate which connects a plus terminal of a battery and a minus terminal of an adjacent battery in each of the terminal accommodating chambers, and connecting the terminal accommodating chambers which are separately provided along a longitudinal direction of the terminal accommodating chamber part and are adjacent to each other by U-shaped elastic connecting members; and total plus/minus terminal blocks, which are externally attached to the terminal accommodating chambers at two ends respectively, and which are formed of terminal block main bodies and busbars, wherein one ends of the busbars are fastened to total plus/minus terminals in the terminal accommodating chambers at the two ends, the other ends of the busbars are fastened to an adjacent module or a connecting busbar of an external equipment, and flexible resin material is used for the busbar plate main body, and high strength resin material is used for the terminal block main bodies.

2. The busbar plate according to claim 1, wherein the terminal block main body is formed with a press-fitting groove into which the busbar is inserted.

3. The busbar plate according to claim 1, wherein a temporary holding projection, which is used to temporarily hold a mating component when the busbar plate is attached to the mating component, is formed at the upper part of the surface of the terminal block main body that faces the mating component.

* * * * *